(12) United States Patent
Beinhocker

(10) Patent No.: US 7,924,166 B2
(45) Date of Patent: Apr. 12, 2011

(54) NUCLEAR LEAKAGE DETECTION SYSTEM USING WIRE OR OPTICAL FIBER

(75) Inventor: Gilbert D. Beinhocker, Belmont, MA (US)

(73) Assignee: Tamperproof Container Licensing Corp., Belmont, MA (US)

( * ) Notice: Subject to any disclaimer, the term of this patent is extended or adjusted under 35 U.S.C. 154(b) by 59 days.

(21) Appl. No.: 12/779,124

(22) Filed: May 13, 2010

(65) Prior Publication Data

US 2010/0289651 A1 Nov. 18, 2010

Related U.S. Application Data (60) Provisional application No. 61/179,143, filed on May 18, 2009.

(51) Int. Cl.
*G08B 21/00* (2006.01)

(52) U.S. Cl. ............ 340/652; 340/687; 340/568.2; 340/541; 376/245; 376/293; 376/450; 588/16

(58) Field of Classification Search ............ 376/203, 376/205, 245, 248–251, 259, 272, 293, 414, 376/450; 215/230; 588/16; 324/518, 750.23; 398/13, 17, 20, 21, 28; 340/541, 555, 652, 340/687, 568.2
See application file for complete search history.

(56) References Cited

U.S. PATENT DOCUMENTS

| | | | |
|---|---|---|---|
| 2,311,613 A | 2/1943 | Slayter | |
| 3,320,114 A | 5/1967 | Schulz | |
| 3,634,845 A | 1/1972 | Colman | |
| 3,664,904 A * | 5/1972 | Cook | .......... 428/102 |
| 3,714,644 A | 1/1973 | Hellstrom | |
| 3,947,837 A | 3/1976 | Bitterice | |
| 4,095,872 A | 6/1978 | Stieff et al. | |
| 4,118,211 A | 10/1978 | Au Coin et al. | |
| 4,161,348 A | 7/1979 | Ulrich | |
| 4,175,827 A | 11/1979 | McMahon | |

(Continued)

FOREIGN PATENT DOCUMENTS

GB 13359 1/1914

(Continued)

OTHER PUBLICATIONS

Bonner, Robert C., "Remarks of U.S. Customs Commissioner Robert C. Bonner*: U.S. Customs and Border Protection C-TPAT Conference San Francisco, California Oct. 30, 2003," http://www.cpb.gov/xp/cgov/newsroom/comissioner/ speeches_statements/0ct30.2003.xml (8 pages).

(Continued)

*Primary Examiner* — Daniel Wu
*Assistant Examiner* — Frederick Ott
(74) *Attorney, Agent, or Firm* — Weingarten, Schurgin, Gagnebin & Lebovici LLP (57) ABSTRACT

A system for detecting and containing a breach in a container. The container wall includes containment layers and a sensor layer sandwiched between the containment layers. The sensor layer contains a signal path that can be carried by a signal cable such as fiber optic or wire cable. The containment layers contain shards of material. When the wall of the container is compromised, the signal in the sensor layer is altered by the disturbed shards cutting the signal cable, thus allowing for the detection of a rupture, vandalism or an unauthorized access attempt, The containment layers may be composed of a gel or rubber material to slow leakage.

40 Claims, 6 Drawing Sheets

U.S. PATENT DOCUMENTS

| | | | |
|---|---|---|---|
| 4,195,907 A | | 4/1980 | Zamja et al. |
| 4,217,488 A | | 8/1980 | Hubbard |
| 4,228,425 A | | 10/1980 | Cooke |
| 4,234,875 A | | 11/1980 | Williams |
| 4,297,684 A | | 10/1981 | Butter |
| 4,367,460 A | | 1/1983 | Hodara |
| 4,447,123 A | | 5/1984 | Page et al. |
| 4,488,269 A | | 12/1984 | Robinson et al. |
| 4,516,679 A | * | 5/1985 | Simpson et al. ........... 206/459.1 |
| 4,526,752 A | | 7/1985 | Perlman et al. |
| 4,538,527 A | | 9/1985 | Kitchen |
| 4,573,202 A | | 2/1986 | Lee |
| 4,603,252 A | | 7/1986 | Malek et al. |
| 4,772,092 A | | 9/1988 | Hofer et al. |
| 4,801,213 A | | 1/1989 | Frey et al. |
| 4,867,820 A | | 9/1989 | Jacobson et al. |
| 4,908,510 A | | 3/1990 | Huggins et al. |
| 4,931,771 A | | 6/1990 | Kahn |
| 4,935,723 A | | 6/1990 | Vallance |
| 4,972,176 A | | 11/1990 | Vallance |
| 5,003,374 A | | 3/1991 | Vokoun, III |
| 5,049,855 A | | 9/1991 | Slemon et al. |
| 5,081,363 A | | 1/1992 | Tetzlaff et al. |
| 5,119,862 A | | 6/1992 | Maimets et al. |
| 5,180,060 A | | 1/1993 | Forti et al. |
| 5,194,847 A | | 3/1993 | Taylor et al. |
| 5,309,533 A | | 5/1994 | Bonniau et al. |
| 5,323,011 A | | 6/1994 | Suter et al. |
| 5,355,208 A | | 10/1994 | Crawford et al. |
| 5,359,416 A | | 10/1994 | Mueller |
| 5,568,124 A | | 10/1996 | Joyce et al. |
| 5,592,149 A | | 1/1997 | Alizi |
| 5,609,952 A | | 3/1997 | Weiss |
| 5,769,232 A | | 6/1998 | Cash et al. |
| 5,790,025 A | | 8/1998 | Amer et al. |
| 5,918,268 A | | 6/1999 | Lukas et al. |
| 6,002,501 A | | 12/1999 | Smith et al. |
| 6,065,870 A | | 5/2000 | Nunez |
| 6,213,167 B1 | | 4/2001 | Greenland |
| 6,487,895 B2 | | 12/2002 | Brooker et al. |
| 6,556,138 B1 | | 4/2003 | Silva et al. |
| 6,879,257 B2 | | 4/2005 | Hisano |
| 6,891,470 B2 | | 5/2005 | Bohnic, Jr. |
| 6,919,803 B2 | | 7/2005 | Breed |
| 7,098,444 B2 | | 8/2006 | Beinhocker |
| 7,137,525 B2 | | 11/2006 | Gibney |
| 7,211,783 B2 | | 5/2007 | Beinhocker |
| 7,352,284 B2 | | 4/2008 | Krill |
| 7,482,924 B1 | | 1/2009 | Beinhocker |
| 2002/0089434 A1 | | 7/2002 | Ghazarian |
| 2003/0151509 A1 | | 8/2003 | Iannotti et al. |
| 2003/0174059 A1 | | 9/2003 | Reeves |
| 2003/0193032 A1 | | 10/2003 | Marshall |
| 2004/0037091 A1 | | 2/2004 | Guy |
| 2004/0046660 A1 | | 3/2004 | Ando |
| 2004/0047142 A1 | | 3/2004 | Goslee |
| 2004/0056767 A1 | | 3/2004 | Porter |
| 2006/0151656 A1 | | 7/2006 | Gallagher et al. |
| 2007/0001844 A1 | | 1/2007 | Krill |
| 2008/0116361 A1 | * | 5/2008 | Sanders et al. ........... 250/227.18 |
| 2008/0211669 A1 | | 9/2008 | Dagher et al. |
| 2009/0115607 A1 | | 5/2009 | Beinhocker |
| 2009/0239436 A1 | * | 9/2009 | Ohnstad et al. ............... 442/294 |

FOREIGN PATENT DOCUMENTS

| | | |
|---|---|---|
| WO | WO 93/11513 | 6/1993 |
| WO | WO 93/23648 | 11/1993 |
| WO | WO 98/26388 | 6/1998 |

OTHER PUBLICATIONS

Kimura et al., "New Techniques to Apply Optical Fiber Image Guide to Nuclear Facilities," J. Nuc. Sci. and Tech., vol. 39, No. 6, pp. 603-607 (Jun. 2002).

Lu et al., "Gamma-induced attenuation in normal single-mode and multimode, Ge-doped and P-doped optical fibers: A fiber optic dosimeter for low dose levels," Published on the NRC Research Press Web site on May 11, 2000, Can. J. Phys. vol. 78, pp. 89-97.

Nucsafe Inc., Introduction "Fiber Sensing Technology— The Long and Short of It," http://nucsafe.com/Puma/introduction.htm May 21, 2004, p. 1 of 1.

Nucsafe Inc., "Why Neutrons," http://nucsafe.com/Puma/why_neutrons.htm, May 21, 2004, p. 1 of 1.

Nucsafe Inc., "Guardian CRMS," http://nucsafe.com/Puma/guardian_crms.htm, pgs. May 21, 2004, 6 pages.

Nucsafe Inc., "Fiber Optic Facility," http://nucsafe.com/Puma/fiber_facilities.htm, May 21, 2004, 2 pages.

Nucsafe Inc., "Detecting Neutrons," http://nucsafe.com/Puma/detecting_neutrons.htm, May 21, 2004, 3 pages.

Nucsafe Inc., "Photonics," http://nucsafe.com/Puma/pr_photonicsspectra.htm, Jul. 9, 2004, 2 pages.

Nucsafe Inc., "Tech Transfer," http://nucsafe.com/Puma/pr_techtransfer.htm, Jul. 9, 2004, 2 pages.

Nucsafe Inc., "Press Release—Frist Applauds Job Creation At Oak Ridge Based-Nucsafe," http://nucsafe.com/Puma/pr_knoxnews.htm, Jul. 9, 2004, 3 pages.

Nucsafe Inc., "Optical Properties," http://nucsafe.com/Puma/properties_of_scintillating_fibe.htm, Jan. 12, 2005, p. 1 of 1.

Ott, Melanie N., "Radiation Effects Data on Commercially Available Optical Fiber: Database Summary," Nuclear Science and Radiation Effects Conference, Phoenix, Arizona, NSREC 2002, Data Workshop Proceedings, July, 8 pages (we believe this to be accurate).

Ott, Melanie N., "Radiation Effects Expected for Fiber Laser/Amplifier Rare Earth Doped Optical Fiber," NASA Survey Report (Mar. 26, 2004), 7 pages.

Simpson, Doug, "US port security system set for launch," www.boston.com/news/nation/articles/2004/03/25/us_port_security_system_set_for_launch?mode=PF, pp. 2 of 2, (2004).

Giallorenzi et al. Optical fiber sensor technology, IEEE Journal of Quantum Electronics, vol. QE-18, No. 4 (Apr. 1982), pp. 626-665.

* cited by examiner

NUCLEAR LEAKAGE DETECTION SYSTEM USING WIRE OR OPTICAL FIBER

CROSS REFERENCE TO RELATED APPLICATIONS

This application claims the benefit under 35 U.S.C. §119(e) of U.S. Provisional Patent Application No. 61/179,143, filed on May 18, 2009.

This application is related to: U.S. Pat. No. 6,995,353 issued on Feb. 7, 2006, entitled TAMPER-PROOF CONTAINER; U.S. Pat. No. 7,608,812, issued Oct. 27, 2009, entitled TAMPER DETECTION SYSTEM; U.S. Pat. No. 7,211,783 issued May 1, 2007, entitled TAMPER-PROOF CONTAINER; U.S. Pat. No. 7,098,444 issued Aug. 29, 2006, entitled TAMPER PROOF CONTAINER; U.S. Pat. No. 7,332,728, issued Feb. 19, 2008, entitled TAMPER PROOF CONTAINER; U.S. Pat. No. 7,394,060 issued Jul. 1, 2008, entitled TAMPER DETECTION SYSTEM HAVING A PLURALITY OF INFLATABLE LINER PANELS WITH OPTICAL COUPLERS; U.S. Pat. No. 7,482,924 issued Jan. 27, 2009, entitled CARGO CONTAINER SECURITY SYSTEM COMMUNICATIONS, U.S. Pat. No. 7,619,226, issued Nov. 17, 2009, entitled INTEGRATED OPTICAL NEUTRON DETECTOR, and U.S. patent application Ser. No. 12/283,302, filed Sep. 9, 2008 entitled PIPELINE SECURITY SYSTEM.

STATEMENT REGARDING FEDERALLY SPONSORED RESEARCH OR DEVELOPMENT

N/A

BACKGROUND OF THE INVENTION

The nuclear power industry has, almost from its very beginning, had to deal with the issue of disposing of the nuclear waste generated by its processes. Some may consider that the nuclear industry, having grown in an erratic manner, has been unable to deal with this issue in a way that has resolved the many issues that come with it.

If a solution to the problem of nuclear waste disposal is not found, the consequences to the environment and the health and safety of large populations of people, along with the economic impact, are immeasurably large.

The problem, of course, is that there is, to date, no acceptable method of "permanent" disposal of nuclear waste. It is up for debate what "permanent" can ever mean, when the half-life of radioactive waste is in the thousands and millions of years. The current solution, and one likely for the foreseeable future, is "out of sight—out of mind." Removing spent nuclear fuel from reactors of any sort, whether from commercial power plants, university labs or military installations, and disposing of the spent fuel is difficult, dangerous and expensive. Nuclear waste, especially intermediate and high-level waste, can be held on site for decades while low-level waste may be quickly transported to permanent storage or burial sites. "Nuclear waste" can also include many collateral items used in nuclear installations such as: clothing, instruments, equipment and associated chemicals.

The current state of affairs in the nuclear industry, with respect to nuclear waste, is best summarized in the collective writings of environmentalist Lorna Salzman, who says that "the longer the problem remains unsolved, the less credible are assurances that an acceptable solution will eventually be found."

In order to minimize the difficulties of finding a "permanent" solution, while constantly storing and moving millions of drums and containers of all sorts of radioactive waste of varying degrees of emission intensity, it is indispensable that the drums and containers be made as secure from the loss of material containment as possible. Notwithstanding continuous improvement over the years since the nuclear industry began drums and containers remain vulnerable to leakage of radioactive materials for a wide variety of technical and operational reasons, such as, corrosion, accident, vandalism and sabotage.

There is a need, therefore, to be able to continuously monitor each drum or container against corrosive leakage, accidental damage, theft or acts of terrorism. Further, these security systems need to be able to report upon the detection of any type of change in status in a manner that is timely and effective.

BRIEF SUMMARY OF THE INVENTION

In one embodiment, a detection and containment system for detecting and containing a breach in a container includes a first containment layer; a first sensor layer coupled to the first containment layer and having at least one signal path extending across substantially an entire area of the first sensor layer; and a second containment layer coupled to the first sensor layer such that the first sensor layer is sandwiched between the first and second containment layers. A failure of the at least one signal path to conduct a signal from a first end to a second end signifies a breach, or an attempted breach, of at least one of the first and second containment layers.

Embodiments of the present invention are particularly useful to monitor, in real-time, the storage of hazardous material, such as nuclear waste drums holding radioactive material, to ensure there is no leakage that might pollute a facility or the environment. The system constitutes a first line of defense to detect, for example, any attempts to break into a storage drum of radioactive nuclear waste.

Further, embodiments of the present invention are applicable to access doors or hatches leading to protected spaces. In one non-limiting example, the detection and containment system is associated with a hatch, which could include a manhole cover or door. Any attempts to breach the hatch or door will then be detected by the present system.

BRIEF DESCRIPTION OF THE SEVERAL VIEWS OF THE DRAWINGS

Various aspects of at least one embodiment of the present invention are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures.

DETAILED DESCRIPTION OF THE INVENTION

The disclosures of U.S. Pat. Nos. 6,995,353, 7,211,783, 7,098,444, 7,332,728, 7,394,060, 7,482,924, 7,619,226 and 7,608,812, U.S. patent application Ser. No. 12/283,302, and U.S. Provisional Patent Application No. 61/179,143 are incorporated by reference herein for all purposes.

Embodiments of the present invention provide an effective fail-safe leakage detection system that encapsulates the outside walls of any size or configuration of container and which secures the volumetric space of the container with a signal path carried by an optical fiber or electrical wire disposed in the system, as will be described below. Any intrusion, or attempted intrusion, whether accidental or deliberate, that breaches, or comes close to breaching, the container wall will be instantaneously detected. The primary mode of detection is that of detecting a loss of a signal in the signal path due to a mechanical break, e.g., a cut, in either the optical fiber or the electrical wire. In the case of the optical fiber, a radiation leak is detected by the reduction in the signal due to the effects of the radiation on the optical fiber. Further, either a leak from within, or intrusion from outside, will result in an immediate local and/or remote alarm via a communication link coupled to the optical fiber or electrical wire.

The invention is also useful to monitor, in real-time, the storage of hazardous material, such as nuclear waste drums holding radioactive material, to ensure there is no leakage that might pollute a facility or the environment. In one embodiment, the leakage of radioactive material, whether by an attempt to breach or due to a failure of the container, will be detected by the radiation's effect on the optical fiber. Thus, the system constitutes a first line of defense to detect, a storage drum failure or any attempts to break into a storage drum of radioactive nuclear waste.

A flexible and wrappable sensor sheet is provided having an optical fiber or electrical wire disposed therein in a zigzag, symmetrical or other pattern that covers substantially the entire area of the sheet. A light or current signal source is provided at one end of the continuous circuit to introduce light or current signal into the path. A light or current detector is coupled to the other end of the path to sense the continuous or pulsed light signal or electrical signal transmitted through the path on a fail-safe basis. The loss of a detectable signal may be due to a cut in the signal path or damage to an optical fiber path due to radiation. Additionally, the loss of the signal may be due to an equipment failure, for example, failure of the signal source, a power supply, a detector and the like. Regardless of the reason for the loss of the signal, therefore, an alarm will be asserted. The detection signal may be encrypted or actively interrogated by a monitoring station to prevent theft, sabotage, or acts of terrorism. Additionally, any attempts to cloak, block, jam or otherwise interfere with the signal will be detected by operation of the regular interrogation and/or encrypted signal.

Alternatively, each sensor sheet section can have its own light or current source and its own respective light or current detector for sensing the presence or absence of a signal from the respective paths to more specifically locate the part of the drum or container where the leakage or intrusion has taken place.

Figure 1:
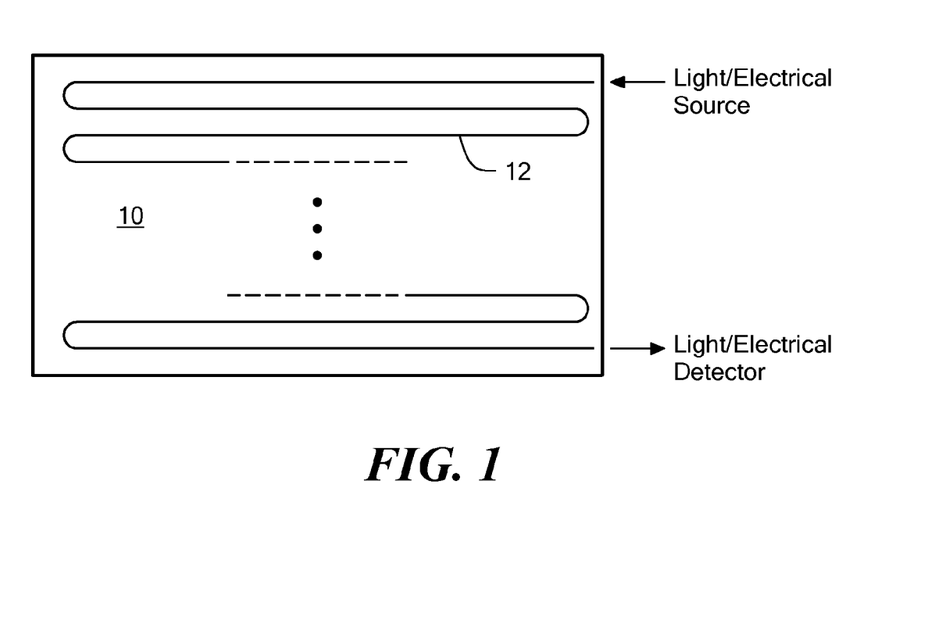
FIG. 1 is a diagrammatic view of a sheet containing an optical or electrical path therein, in accordance with an embodiment of the present invention.

A sensor sheet or layer in accordance with an embodiment of the present invention is illustrated diagrammatically in FIG. 1. A sheet 10 of flexible and wrappable material has disposed therein, and across substantially the entire area thereof, an optical fiber or electrical wire 12 having a first end and a second end. The optical fiber or electrical wire 12 defines a continuous signal path from the first end to the second end.

A light source, in the case of an optical fiber, or an electrical signal source, in the case of an electrical wire, provides a light or electrical signal, respectively, to the first, i.e., input end of the path. A light detector, in the case of an optical fiber, or an electrical signal detector, in the case of an electrical wire, is coupled to the second or receiving end of the signal path and detects the light or electrical signal from the path and provides an output signal indication thereof.

The optical fiber or electrical wire can be woven into a fabric sheet or can be disposed in a sheet of non-woven material. The sheet can be of any material that is flexible and wrappable such that the sheet can be wrapped around the outer surface of a container or other structure to be protected.

The sheet can contain, or have added to it, a resin or other material that can be hardened or rigidized after the container is wrapped with the sensor sheet to act as a protective covering and to retain the sheet about the outer surface of the container. The sheet may be retained about the container by other means as well, such as an outer protective covering placed over the sheet wrapped onto the container and which is secured to retain the sensor sheet in place on the outer surface of the container. The sensor sheet may be sandwiched or laminated with other materials providing intended protection or other functionality, such as structural protection, abrasion resistance, and the like, as will be described below.

In one embodiment, the sensor sheet is made of a flexible rollable material. The sheet is rolled up prior to installation on the container or other elongated object to be protected. The sheet is unrolled during installation and wrapped around the container or section thereof to provide a sensor that covers the entire intended area of the container surface.

The individual sensor sheets can be interconnected to provide one continuous optical or electrical path through the adjacent sensor sections. Alternatively, each sensor section can have its own independent light or current source, its own light or current detector and its own independent power supply or alarm transmission system.

In one embodiment, the optical fiber can be woven into the fabric as it is made such that a long web of fabric can be manufactured and rolled onto a reel for shipment to an installation site. The fabric can be unrolled and extended along a section of container and secured thereto to substantially cover the outer surface of the container section. Similar fabric webs can be wrapped about adjacent sections of the container such that the entire length of the container, or an intended extent of the container, is covered by the sensor fabric. Optical connectors or couplers are provided at respective ends of the web sections and are interconnected to provide a continuous optical path through the adjacent web sections that cover the container. This method allows a resolution to detect even a small breach of the container.

Light from a suitable source is introduced into one end of the sensor sheet or web and an optical sensor or detector is disposed at the other end of the sensor sheet or web to detect light emanating from the continuous optical path. The light detector is coupled to signal processing circuitry that is operative to provide an alarm signal in the event of failure to receive the detected light or the diminishment of detected light below a predetermined threshold.

A breach or break at any point in the optical path of the optical fiber will cause a disconnection in the light signal, and the absence of light at the light detector will trigger an alarm condition.

The optical fiber may be manufactured such that, if the fiber is exposed to radiation near the sensor sheet, either from within or outside of the container, the optical transmissibility of the optical fiber is reduced, as discussed in U.S. Pat. No. 7,619,226. The optical fiber core and/or its cladding constitute a large size physical radiation detector that integrates the radiation over time and/or over the length and volumetric mass of the fiber, making the fiber sensitive to even low level radiation. Local environmental background radiation can be measured to offset the detection level designated to trigger an alarm.

The optical fiber is monitored for a change in its transmissibility, as indicated by reception of an attenuated light signal coming from its output. An attenuated light signal that is below a predetermined threshold level can trigger an alarm. Thus, a signal may be received and still indicate an alarm condition because of its lowered amplitude or other characteristic. The alarm can be in the form of an annunciator and/or can be the sending of a message that can include information about the time or location of the breach.

Alternatively, a detected light signal that is below a predetermined threshold may be used to indicate that a visual and/or physical check of the system should be performed. For example, consider the case where the optic fiber is configured to have reduced transmissibility in response to being exposed to radiation. A detected signal that drops below the threshold may indicate that there is radiation in the area and this should be investigated, if possible.

Figure 2:
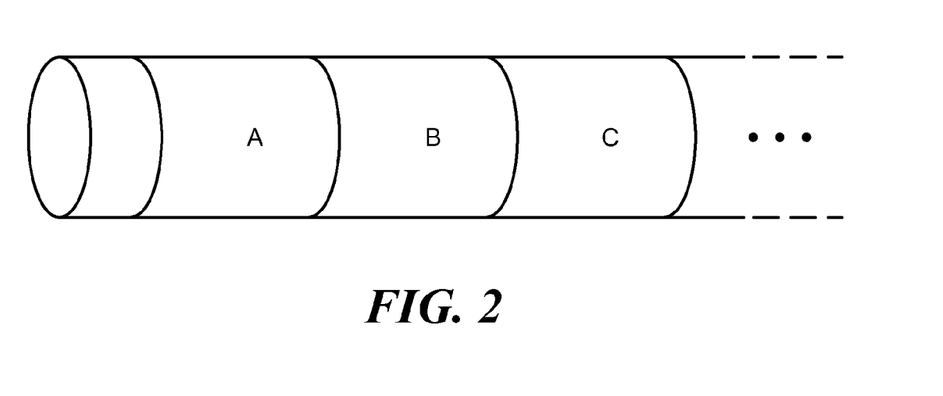
FIG. 2 is a diagrammatic view of a section of a container having a plurality of sensor sheets wrapped along contiguous sections of the container.

Any size container can be wrapped with a liner made of fabric or other flexible material that can be wrapped over the outer surface of the container. Any suitable material such as polymer resins can be employed that can structurally and functionally hold optical fiber or electrical wire placed in any geometrical pattern, with any space resolution between optical fibers or electrical wires. Each optical fiber or electrical wire forms a single continuous optical or electrical pathway. Two or more sensor sheets may be employed to cover respective sections of a container, especially large containers where a single sensor sheet would be impractical. A container divided into sections A, B, C and D is shown in FIG. 2. Each individual section can have its own light or current source, or its own light or current detector. Each section can have its own GPS/communication unit or location memory chip/communicator so that any break in a section causes transmission of a detailed geographical and time of intrusion signal to one or more container monitoring stations.

The sensor sheets A, B, C or D, can be any length or width so as to fit a container with appropriate coverage and length so that a break or intrusion into the container can instantly cause an alarm signal specifying the exact position on the container, and, because of the geometric resolution structure, the approximate size of the intrusion. A hard resin can fix the sections securely to the container, and provide resistance to an intrusion or break and provide information in real-time on the intrusion.

Figure 3:
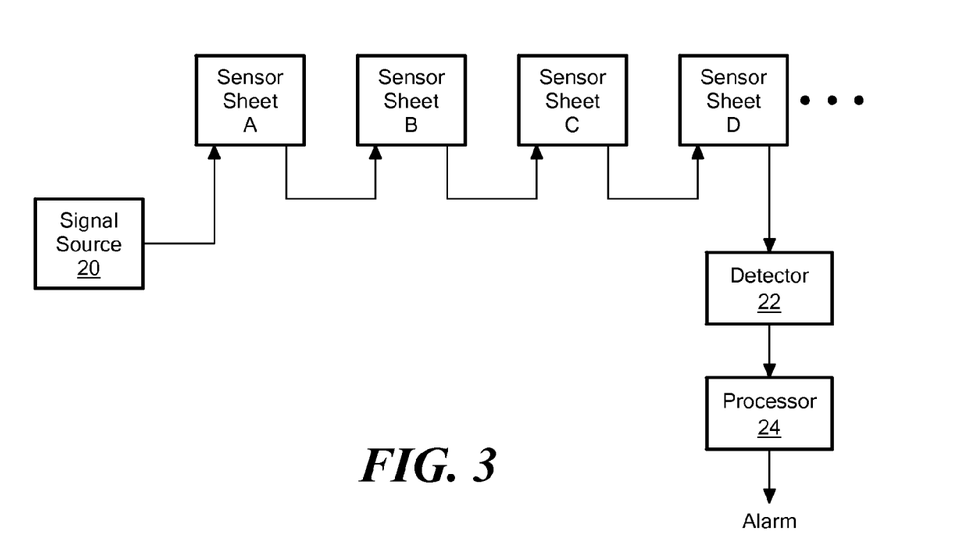
FIG. 3 is a block diagram of an embodiment of the present invention having a plurality of interconnected sensor sheets.

An embodiment of the present invention in which the sensor sheets are interconnected to provide a single continuous signal path is shown in FIG. 3. The optical fiber or electrical wire providing the signal path in each of the sensor sheets is serially interconnected with the optical fiber or wire of adjacent sheets such that a single signal path is provided from one end of the interconnected sheets to the opposite end of the interconnected sheets covering the entire container.

A signal source 10 provides an optical or electrical signal to the continuous path, depending on whether an optical fiber or electrical wire is used for the path. A detector 12 is coupled to the opposite end of the continuous path to sense the optical or electrical signal from the path and to provide an output signal to a processor 14 that is operative to provide an alarm notification signal in the event of the loss of a signal from the signal path or in the event of a sufficient degradation in the signal to cause an alarm condition.

Figure 4:
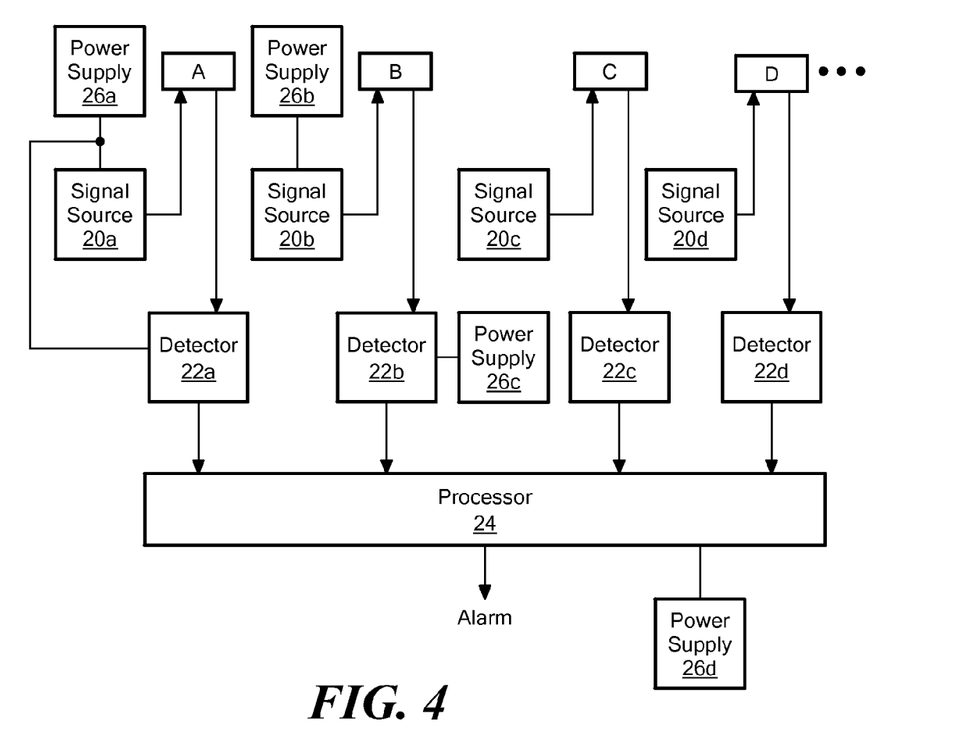
FIG. 4 is a block diagram of an embodiment of the present invention in which each of the sensor sheets has its own signal source and detector and/or power supply and associated circuitry.

An embodiment in which each of the sensor sheets has its own signal source and detector is shown in FIG. 4 in schematic form. In this embodiment, each of the sensor sheets A, B, C and D has a signal source 20a-20d coupled to one end of the signal path of the respective sheets. The other end of the signal path of the respective sheets is coupled to respective detectors 22a-22d. The output from each of the detectors 22a-22d is connected to a processor 24 that provides an output signal in the event of an alarm condition sensed by any one or more of the detectors. The alarm notification in this embodiment can provide an indication of which detector has sensed an alarm condition and therefore indicate in real time which sensor sheet and, therefore, which section of the container, has experienced an actual or attempted intrusion.

As shown in FIG. 4, various combinations of power supplies may be provided for the signal sources and detectors. For example, a single power supply 26a may be provided to power a signal source 20a and a detector 22a for a specific sheet A. Alternately, a signal source 20 may have its own power supply 26b and the corresponding detector 22b may have its own power supply 26c. The processor 24 may have its own power supply 26d. One of ordinary skill in the art will understand that the provisioning of power supplies for the signal sources, detectors and the processor is a design choice driven by reliability and redundancy requirements the overall system may have to meet.

In one embodiment of the present invention, the sensor sheet containing the fiber or wire is fashioned in a sandwich manner between layers of protective resin. The resin may be embedded with self-sealing chemical materials, known to those skilled in the art, having specifications to cause a delay in the leakage of material from within the container due to either corrosive or accident-induced, or deliberate, intrusion from outside the container.

As described above, when either the optical fiber or electrical wire embedded in the sensor fabric is corroded, drilled, pierced or cut, the optical or electrical circuit pathway is broken and the light or electrical detector will fail to detect the continuous transmission of either the light or electrical signal, and the detector will transmit an alarm signal. The optical or electrical signal is transmitted continuously and hence functions as a fail-safe signal that will create an alarm for any reason that the circuit pathway is broken, or when the signal is no longer being received, including loss of power or component failure. In some instances, as described above, a signal may still come through but if its intensity or amplitude is less than some predetermined threshold, then an alarm will be sounded.

Advantageously, a single optical or electrical circuit encapsulates the entire volumetric space of the container when the sensor sheet is wrapped around the outer surface of a hazardous material storage container. A container may be a drum or any other volumetric structure.

The sensor sheet sandwiched between single or multiple layers of resin, or additionally other types of fabric with self-sealing or protective characteristics, can be made as a single wrap-around sheet for the outside of a cylindrically shaped nuclear waste drum or may be made in sections that are optically or electrically interconnected by the use of connectors, as described above. Sections may be made for the bottom and top of a drum with the wrap-around side, top and bottom all inter-connected with one another to provide a single or multiple circuit detector system.

When the container is breached, from within or from without, the system will generate an alarm signal. Almost simultaneously, the resin and/or fabric outer layers will act to provide a seal by, for example, a chemical reaction from coming into contact with air, or by other means, and delay the flow of material from within the drum to the outside of the drum.

The sandwich construction sets the optical fiber or electrical wire sensor sheet between two, or multiple, layers of special resins or self-sealing polymers. Further, fabrics or materials with special properties, such as Kevlar®, can be used to protect two dimensional, i.e., flat surfaces, such as high security doors or walls. Thus, embodiments of the present invention provide a detection system for low-level leakage as might be caused by a gunshot or an explosive device. Detecting the presence and location of damage caused by a bullet or explosive penetration makes the Kevlar protection more effective. The functional benefit of such "protection" applications is to "detect and delay."

Conventional security doors, such as ones made of manganese steel or reinforced walls, might delay an intruder but security responders may only be alerted, or become aware, after an intruder has already entered, and possibly left, a secured area. As a result, the intruder may gain extra time to escape because the time of response can be calculated or predetermined by observation. If the detection is made immediately upon an attempted entry, however, the extra time needed to gain entry through the protection layers can be used to increase the probability of capturing the intruder, instituting alternate security procedures, or alternately sounding an alarm warning the intruder off. This incipient alarm feature can provide vital time in giving responders sufficient time to take action.

Figure 5:
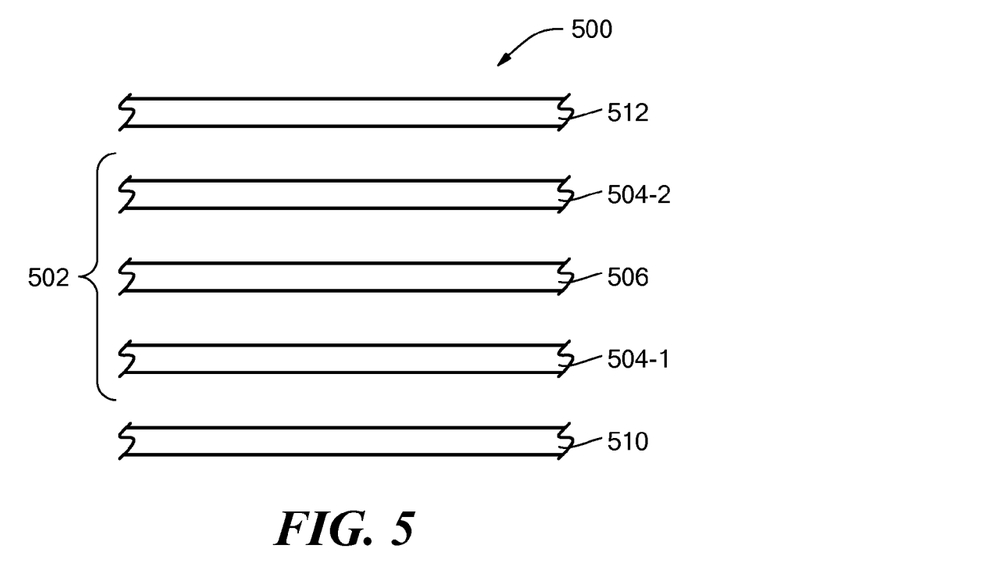
FIG. 5 is an exploded view of a sensor assembly in accordance with an embodiment of the present invention.

In one embodiment of a sandwich-type sensor sheet, a 3-ply construction sensor assembly 502 is provided as shown in FIG. 5. Here, the layers are shown spaced apart for ease of explanation, but one of ordinary skill in the art would understand that they are intended to be adjacent to one another in application. The sensor assembly 502 includes an inner adhesive, self-sealing layer 504-1, a sensor layer 506 that includes an optical fiber and/or an electrical wire and an outer adhesive, and a self-sealing layer 504-2 positioned on the other side of the sensor layer or 506. The 3-ply construction sensor assembly 502 is attached to a surface 510 of a container and then covered with a protective coating or layer 512 that provides mechanical protection of the sensor assembly 502. The inner and outer self-sealing layers 504-1, 504-2, may comprise a resin material.

In the configuration shown in FIG. 5, as soon as either the outer (intrusion) layer 504-2 or inner (leakage) layer 504-1 is pierced, the sensor layer 506 in the center is also pierced causing a detection signal. In turn, an alarm signal is immediately transmitted to a designated communications link to pass to an authorized monitoring station.

Figure 6:
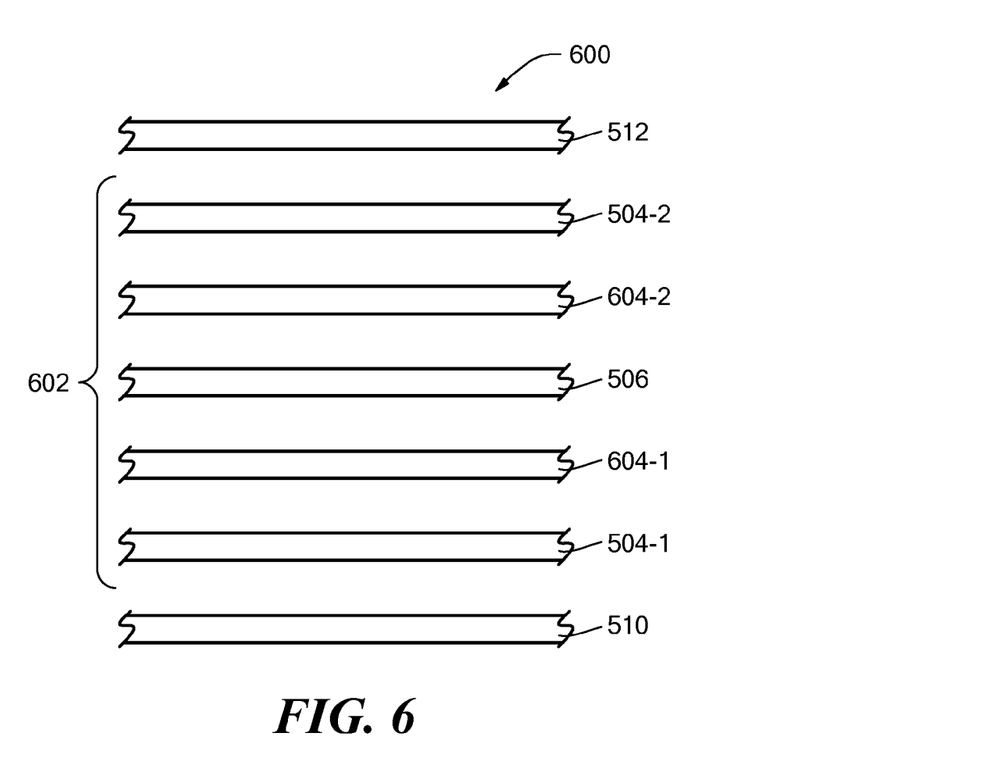
FIG. 6 is an exploded view of a sensor assembly in accordance with another embodiment of the present invention.

In another embodiment of a sandwich-type sensor sheet, a 5-ply construction sensor 602 is provided as shown in FIG. 6. Here, the layers are spaced apart for ease of explanation as well. The sensor assembly 602 includes an inner (leakage) adhesive, self-sealing layer 504-1 followed by an inner protective layer 604-1 which may be made from, for example, Kevlar® material, then located next to a sensor layer 506. An outer (intrusion) protective layer 604-2, also made of Kevlar®, is positioned on the other side of the sensor layer 506 and is followed by another adhesive, self-sealing layer 504-2, that is, an outer (intrusion) layer. The 5-ply construction sensor 602 is then provided on the outer surface 510 of the container and then covered with a protective coating layer 512, as described above.

Advantageously, in an example based on one embodiment of the present invention, if the outer layer 504-2 is breached, the detection signal is triggered and the inner layer 504-1 provides an effective delay time so that the breach can be dealt with by responders in a timely manner. In addition, the self-sealing feature of the layer prevents or delays the passage of material from within the container into the storage facility or outside environment.

Additionally, another feature of the present invention provides that the single or multiple layers of resin contain micro bubbles of chemical compounds that, when contacted with the material effusing from the breach or in contact with air, will coat the effusing material with a color dye to more readily facilitate visual location of where on the container or drum walls the leakage is occurring. The actual time delay duration of the "detect and delay" sequence can be chosen for a specific application requirement by selection of specific resin compounds, chemical compounds, or fabric as known by those skilled in the art.

Embodiments of the present invention thus offer a unique "detect and delay" feature for leakage of a volumetric container by operation of layering of sensor sheets, resins, and fabrics in different configurations with specifications suitable to protecting virtually any type of vital infrastructure such as: nuclear, chemical or biological material whether as waste or newly manufactured material. Additionally, this construction is amenable to being employed as a wrappable "detect and containment sleeve" around critical infrastructure pipes, such as found in hi-pressure steam generating systems of nuclear power plants, where incipient fissures might be particularly hard to detect by monitoring pressure gauges ahead of a catastrophic rupture.

In addition, a resilient or gel-like material may be used as the self-sealing layer in order to prevent leaks due to, for example, a bullet or other projectile passing through the layers. The resiliency may be provided by materials such as rubber or plastic similar to those material used in, for example, self-sealing gasoline tanks.

One of ordinary skill in the art will understand that either of the embodiments described above may have multiple sensor layers in order to possibly identify a "direction" of incursion by determining which layer was first breached. In addition, if optical fiber that responds to radiation were to be used in a multiple sensor layer application, any change in transmissibility as between the two layers might be indicative of whether the radiation is coming from inside the container or from outside and, therefore, determine what type of response should be made. Further, the sensor layer may be provided in either of the protection or the self-sealing layers.

Figure 7:
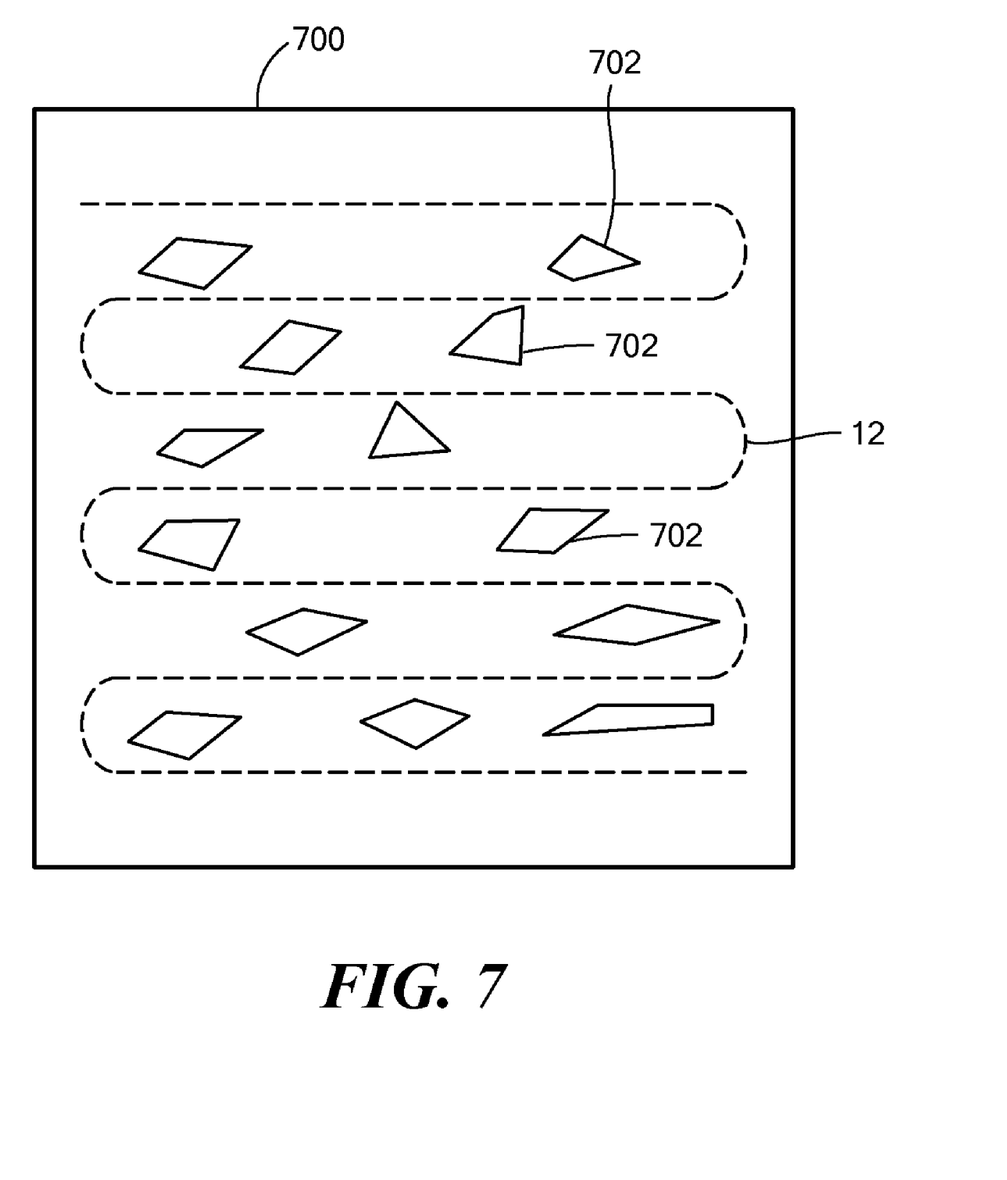
FIG. 7 is a layer of a sensor assembly comprising path cutting material.

In another embodiment of the present invention, in order to increase the feature of delay in the dual strategy of the "detect and delay" protection system, shards of plastic, metal, or other materials that are designed to snare and delay a drill bit are mixed into a layer of resin 700 as shown in FIG. 7. Thus, when an ensnared shard 702 is caught on a drill bit it acts as a scythe to cut the optical fiber or electrical wire 12 embedded or affixed to the sensor sheet thereby triggering the detection signal. Further, the sensor layer 506 may have shards 702 disposed therein to also cut the path if hit by a drill. One would understand that any movement of a shard 702, whether by drill, bullet or shock blast, could cause the shard to cut the path 12.

Further, one or more of the signal source 20, the detector 22 and the power supply 26 may be encapsulated, i.e., "potted," and placed in any one of the self sealing layers 504, the protective layers 604 or the sensor layer 506. In this manner, either of the sandwich-type sensor sheets 502, 602 are "integrated" systems. These devices need not be placed in the same layer and could be "distributed" in different areas of the sensor sheets, i.e., not aligned with one another, so that they are not susceptible to being damaged by the same intrusion, for example, a single projectile that damages all three devices. Of course, one would understand that the signal source 20, the detector 22 and the power supply 26 may need to be either placed in a location that is very difficult to be reached by an intruder or in an area with additional protection. This additional protection may not be necessary, however, as the system is intended to be a fail-safe system where the processor 24 is configured to trigger an alarm condition if a signal is no longer received from the detector 22.

The optical fiber can be chosen or configured such that it exhibits reduced optical transmissibility when exposed to a corrosive agent such, for example, an acid. This reduction in optical transmissibility may be due to the corrosive agent contacting a part of the optical fiber such as, but not limited to, the sheath, the cladding, a coupling or the core where one or more of them has been modified to react or breakdown when coming into contact with the corrosive agent. Additionally, the corrosive agent may be in a solid, liquid or gaseous form and still affect the optical transmissibility. The corrosive agent may be in the container being protected by the sensor sheet of the present invention and its release may be due to a breach or failure of the container. Alternatively, the corrosive agent may have been applied to the container and, therefore, to the present system, in an attempt to either gain access thereto or cause the contents, which might or might not be corrosive themselves, to be released into the environment.

The optical fiber can be chosen or configured such that it exhibits reduced optical transmissibility when exposed to chemically active materials or compounds, such as, for example, Nitrogen, as might be found in fertilizer or explosives. This reduction in optical transmissibility may be due to the chemically active material contacting a part of the optical fiber such as, but not limited to, the sheath, the cladding, a coupling or the core where one or more of them has been modified to react or breakdown when coming into contact. Additionally, the chemically active material may be in a solid, liquid or gaseous form and still affect the optical transmissibility. The material may be in the container being protected by the sensor sheet of the present invention and its release may be due to a breach or failure of the container. Alternatively, it may have been applied to the container and, therefore, to the present system, in an attempt to either gain access thereto or cause the contents, which might or might not be chemically active themselves, to be released into the environment.

Still further, the optical fiber may be chosen or configured such that it exhibits reduced optical transmissibility when exposed to a pathogen, such as might be found in a biological hazard.

Embodiments of the present invention are not only applicable to protecting a space, enclosure or container, as described above, but are also applicable to protecting the access points to such protected spaces. Thus, embodiments of the present invention may be applied to protecting access hatches or hatch covers, including manholes and manhole covers, for gaining entrance to, for example, ducts over sewer systems, water supplies, water valves or electrical conduits. These hatches may be in locations that are in low-trafficked areas and, therefore, mounting a sensing sheet in accordance with the teachings herein provides for detection of hatch failure, unauthorized access or vandalism. The detection systems in accordance with the present invention may be applied either internally or externally to the hatch. This is especially advantageous in those hatch systems that implement multiple hatches with a first, or exterior hatch, protecting or covering a second, or interior, hatch. The detection systems of the present invention may be implemented in conjunction with, or in addition to, other known intrusion systems such as vibration sensors or systems that record or detect the opening or accessing of a hatch.

Figure 8A:
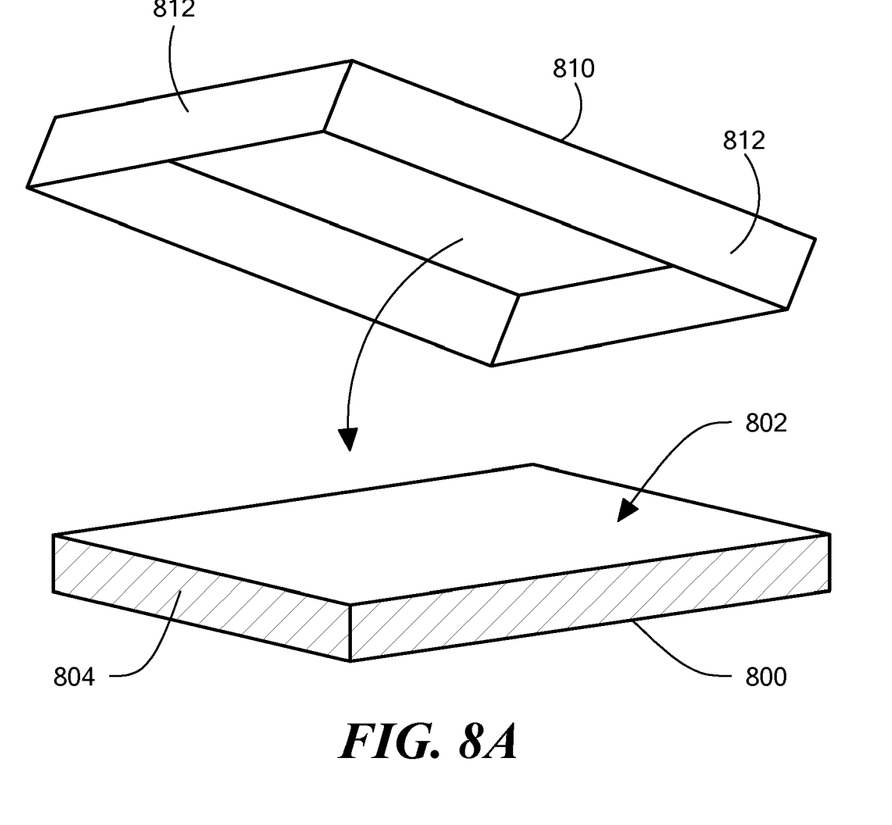
FIGS. 8A and 8B are perspective and side-views of an embodiment as applied to a planar rectangular item such as a door.
Figure 8B:
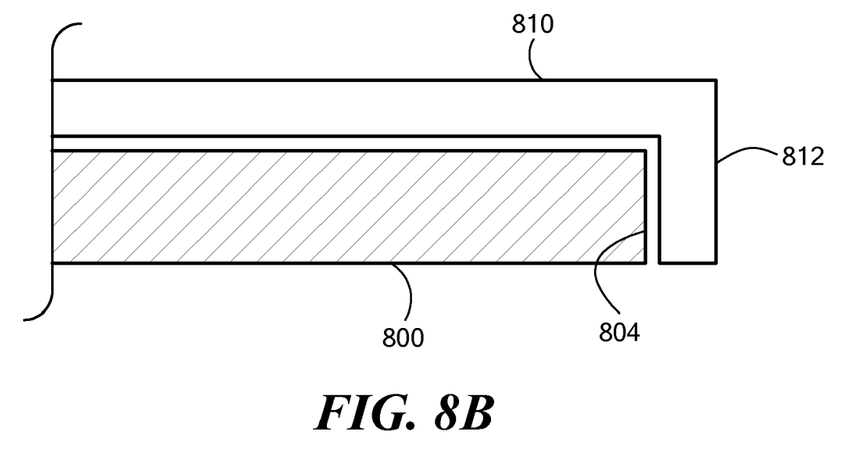

Referring now to FIG. 8A, a generally rectangular hatch portion 800 has a surface 802 and an edge 804 running around the surface 802. Thus, the hatch portion 800 has a thickness defined by the edge 804. A hatch portion 800 could be a door or other moving part of a hatch system that covers an opening. In accordance with an embodiment of the present invention, a security system 810 includes a combination of the sensor, containment and/or protection layers, as described above, and includes edge portions 812 to cover the corresponding edge 804 of the hatch portion 800. As a result, as shown in FIG. 8B, a side-view, the edge portion 812 of the system 810 protects the edge 804.

Figure 9A:
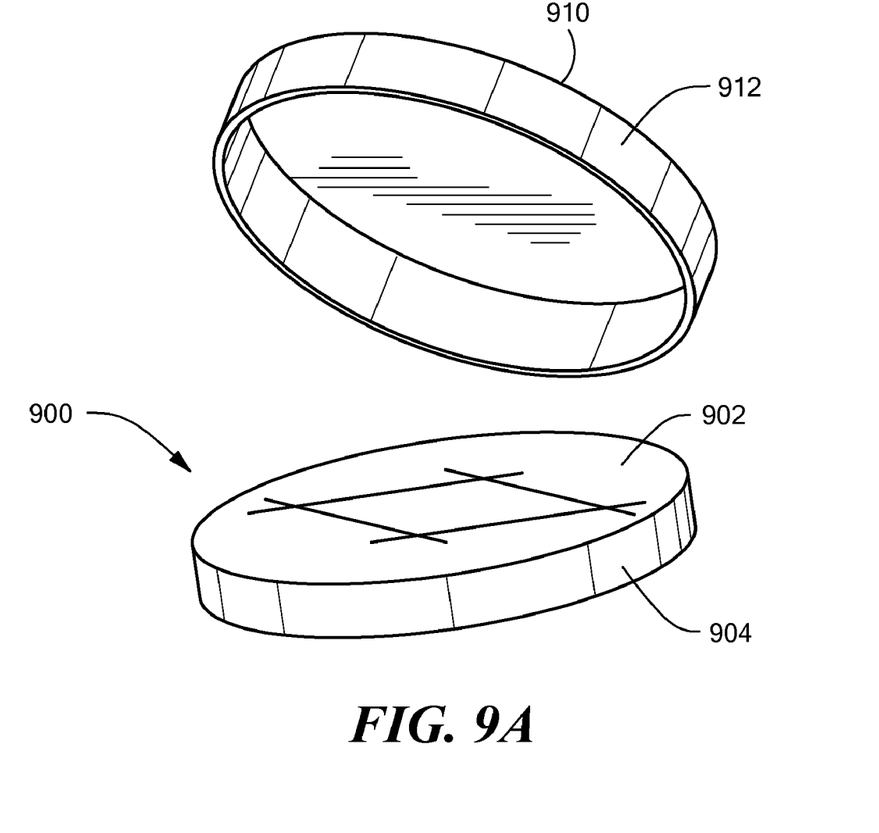
FIGS. 9A and 9B are perspective and side-views of an embodiment as applied to a planar, but circular, item such as a manhole cover.
Figure 9B:
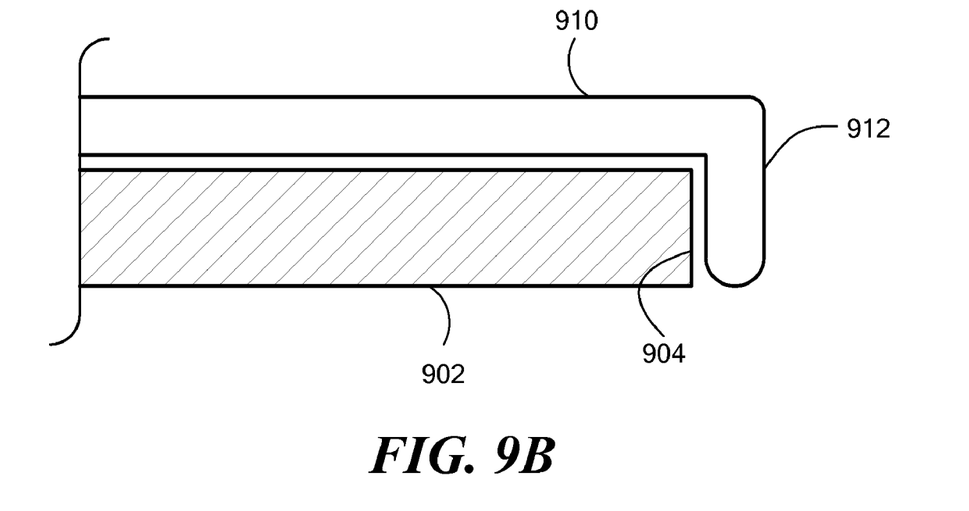

Similarly, referring now to FIG. 9A, a generally circular manhole cover 900 has a surface 902 and an edge 904 running around the surface 902. Thus, the manhole cover 900 has a thickness defined by the edge 904. The manhole cover 900 could be removable or otherwise hinged as a door or other moving part of a hatch system that covers an opening. In accordance with an embodiment of the present invention, a security system 910 includes a combination of the sensor, containment and/or protection layers, as described above, and includes an edge portion 912 to cover the corresponding edge 904 of the manhole cover 900 similar to a cap. As a result, as shown in FIG. 9B, a side-view, the edge portion 912 of the system 910 protects the edge 904 of the manhole cover 900.

The edges of the system may be provided so as to wrap-around or under the edges of the hatch or manhole cover to remove the opportunity for the cover to be physically pried off. Further, any electronics, such as the signal source and/or the signal detector could be placed on the underside of the cover and protected by potting material.

The multilayer system of the present invention may be combined with a security hatch or door as described above. Thus, by attaching the multilayer system to, for example, a manganese or steel reinforced door, any attempts at breaching either the door or the area the door is securing will be detected while, at the same time, the door performs its function of protecting and/or delaying a possible breach.

Embodiments of the present invention are useful for protecting various types of containers or enclosures for which security is deemed a required feature. In addition to the nuclear storage containers noted above, the invention is useful to protect safes, filing cabinets or other containers or enclosures where there is a security need for protection of the container contents. The invention is useful to protect vending machines that dispense cash, credit and other sensitive information, documentation, or goods of value, including ticketing machines of all types, ATM machines, machines for dispensing railroad, airline, bus tickets and the like. A particular application is in the protection of gambling machines, such as machines issuing lottery tickets, slot machines, electronic poker games or other games. Also protectable according to the invention are computers and systems, devices and machines that dispense information or data or that are usable to gain entry into secure environments.

Among the applications in which the detection system of the invention is useful are the following:

Air, sea and land cargo
Pipelines—factory or field applications
Cash, credit card and/or debit card handling machines, for example, ATMs
Remote railway and other ticketing machines
Buildings—enclose the space to detect and delay
Storage tanks and tanks in transit
Secure pallets
Rail cars
HGV road transport
Tunnels
Air ducts
Nuclear waste handling and storage facilities
Telecommunications—infrastructure protection
Water supplies
Remote access pumping stations
Critical control centers for dams
Manholes or access hatches
Chlorine stores
NBC
Pathology labs, in particular, category Four labs
Rail (including subway tunnels)
Key switching centers
Control rooms
Theft avoidance during and after construction—safety concerns with theft of cabling
Gas and oil processing facilities
Remote facilities, particularly ship to shore interface for LNG
Pipelines in vulnerable areas and from ship to shore
Control rooms
Electricity distribution infrastructure
Sub stations' access
Key remote switching centers
Quarries
Remotely located explosive stores

Having thus described several features of at least one embodiment of the present invention, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A detection and containment system for detecting and containing a breach in a container, comprising:
   a first containment layer;
   a first sensor layer coupled to the first containment layer and having at least one signal path extending across substantially an entire area of the first sensor layer; and
   a second containment layer coupled to the first sensor layer such that the first sensor layer is between the first and second containment layers;
   wherein a failure of the at least one signal path to conduct a signal greater than or equal to a predetermined threshold level from a first end to a second end signifies a breach or an attempted breach of the container,
   wherein at least one of the first and second containment layers comprises one or more shards of material each configured to sever the at least one signal path in the first sensor layer when the one or more shards are mechanically disturbed.

2. The detection and containment system of claim 1, wherein the at least one signal path comprises one of an optical fiber and an electrical wire.

3. The detection and containment system of claim 1, wherein at least one of the first and second containment layers comprises a self-sealing material.

4. The detection and containment system of claim 3, wherein the self-sealing material is chosen from a resin and a self-sealing polymer.

5. The detection and containment system of claim 1, further comprising:
   a detector coupled to the at least one signal path and configured to assert an alarm if a signal is detected from the at least one signal path and the detected signal is less than the predetermined threshold level.

6. The detection and containment system of claim 1, further comprising at least one of:
   a first protective layer positioned between the first containment layer and the first sensor layer; and
   a second protective layer positioned between the second containment layer and the first sensor layer.

7. The detection and containment system of claim 6, wherein:
   at least one of the first and second protective layers comprises anti-ballistic material.

8. The detection and containment system of claim 1, wherein the first containment layer comprises a dye.

9. The detection and containment system of claim 8, wherein the dye comprises material that reacts with material stored in the container to coat the stored material with a predetermined color.

10. The detection and containment system of claim 1, wherein the one or more shards comprises at least one of metal and plastic.

11. The detection and containment system of claim 1, wherein the first sensor layer is within one of the first and second containment layers.

12. The detection and containment system of claim 1, wherein the at least one signal path comprises optical fiber that exhibits reduced optical transmissibility when exposed to radiation.

13. The security system of claim 1, wherein:
   the at least one signal path comprises optical fiber that exhibits reduced optical transmissibility when exposed to chemically active compounds.

14. The security system of claim 1, wherein:
   the at least one signal path comprises optical fiber that exhibits reduced optical transmissibility when exposed to a pathogen.

15. The security system of claim 1, wherein the at least one signal path comprises an optical fiber and wherein the optical fiber exhibits reduced optical transmissibility when exposed to corrosive agents.

16. The security system of claim 15, wherein the corrosive agents are gaseous or liquid.

17. The detection and containment system of claim 1, further comprising:
a manganese security door fixedly coupled to the first containment layer.

18. The security system of claim 1, wherein the container comprises a manhole cover.

19. The detection and containment system of claim 1, wherein the container comprises an access port and wherein a failure of the at least one signal path to conduct a signal greater than or equal to a predetermined threshold level from a first end to a second end signifies a breach or an attempted breach of the container through the access port.

20. The detection and containment system of claim 19, wherein the access port is one of a hatch and a hatch cover.

21. A security system comprising:
a first containment layer comprising a first material;
a first sensor layer having at least one signal path disposed therein and extending across substantially an entire area of the first sensor layer, the at least one signal path having a first end and a second end and the at least one signal path comprising at least one of an optical fiber and a wire;
a second containment layer comprising a second material and arranged such that the first sensor layer is between the first and second containment layers; and
at least one detector coupled to the at least one signal path and configured to detect a signal in the signal path from the first end to the second end and, when a signal is detected that is less than a predetermined threshold level, configured to provide a first output signal,
wherein at least one of the first and second containment layers comprises a shard of material configured to sever the at least one signal path in the first sensor layer when the shard of material is mechanically disturbed.

22. The security system of claim 21, wherein each of the first and second containment layers and the first sensor layer is flexible.

23. The security system of claim 22, wherein at least one of the first and second containment layers comprises an adhesive on an exposed surface.

24. The security system of claim 21, further comprising:
a second sensor layer having at least one signal path disposed therein and extending across substantially an entire area of the second sensor layer, the at least one signal path of the second sensor layer having a first end and a second end and the at least one signal path of the second sensor layer comprising at least one of an optical fiber and a wire;
wherein a first end of the at least one signal path of the second sensor layer is coupled to the second end of the at least one signal path of the first sensor layer.

25. The security system of claim 21, further comprising:
a first protective layer positioned between the first containment layer and the first sensor layer; and
a second protective layer positioned between the first sensor layer and the second containment layer.

26. The security system of claim 25, wherein at least one of the first and second protective layers comprises an anti-ballistic material.

27. The security system of claim 21, wherein at least one of the first and second containment layers comprises dye.

28. The security system of claim 27, wherein the dye comprises at least one chemical compound that reacts to air.

29. The security system of claim 27, wherein the dye comprises at least one chemical compound that reacts to a first substance in a container coupled to the security system.

30. The security system of claim 21, further comprising:
a signal source coupled to the first end of the at least one signal path.

31. The security system of claim 30, wherein the signal source comprises one of:
an optical signal source configured to provide an optical signal to the first end of the at least one signal path; and
an electrical signal source configured to provide an electrical signal to the first end of the at least one signal path.

32. The security system of claim 31, wherein the at least one detector comprises one of:
an optical signal detector configured to detect an optical signal; and
an electrical signal detector configured to detect an electrical signal.

33. The security system of claim 21, wherein the shard of material comprises at least one of metal and plastic.

34. The security system of claim 21, wherein at least one of the first and second containment layers comprises a resin.

35. The security system of claim 21, wherein:
the at least one signal path comprises optical fiber that exhibits reduced optical transmissibility when exposed to radiation.

36. The security system of claim 21, wherein:
the at least one signal path comprises optical fiber that exhibits reduced optical transmissibility when exposed to chemically active compounds.

37. The security system of claim 21, wherein:
the at least one signal path comprises optical fiber that exhibits reduced optical transmissibility when exposed to a pathogen.

38. The security system of claim 21, wherein the at least one signal path comprises an optical fiber and wherein the optical fiber exhibits reduced optical transmissibility when exposed to corrosive agents.

39. The security system of claim 38, wherein the corrosive agents are gaseous or liquid.

40. The security system of claim 21, wherein at least one of the first and second materials is self-sealing.

* * * * *